United States Patent
Lapena-Rey et al.

(10) Patent No.: US 9,678,515 B2
(45) Date of Patent: Jun. 13, 2017

(54) LIGHTWEIGHT GAS PRESSURE REGULATOR

(71) Applicant: The Boeing Company, Chicago, IL (US)

(72) Inventors: Nieves Lapena-Rey, Madrid (ES); Enrique Troncoso-Munoz, Seville (ES); Alfredo Criado Abad, Barcelona (ES); Pedro Pablo Martin-Alonso, Madrid (ES); Ji Qing, Shanghai (CN)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 14/526,983

(22) Filed: Oct. 29, 2014

(65) Prior Publication Data

US 2016/0216715 A1    Jul. 28, 2016

(30) Foreign Application Priority Data

Dec. 18, 2013  (EP) ..................................... 13382525

(51) Int. Cl.
*G05D 16/10* (2006.01)
*G05D 16/06* (2006.01)
(Continued)

(52) U.S. Cl.
CPC ......... *G05D 16/10* (2013.01); *G05D 16/0602* (2013.01); *G05D 16/106* (2013.01);
(Continued)

(58) Field of Classification Search
CPC .. G05D 16/0602; G05D 16/10; G05D 16/106; Y10T 137/7795; Y10T 137/7798
See application file for complete search history.

(56) References Cited

U.S. PATENT DOCUMENTS 6,047,727 A * 4/2000 Hatori ..................... F16K 1/305
137/505.25
6,550,717 B1 * 4/2003 MacCready .............. B64C 1/26
244/13
(Continued)

FOREIGN PATENT DOCUMENTS

DE  102010024493 A1  12/2011
EP     0688983 A1  12/1995
(Continued)

OTHER PUBLICATIONS

Swagelok K Series "Pressure Regulators" catalog excerpt (MS-02-230)(2006) <http://www.swagelok.com/downloads/webcatalogs/en/MS-02-230.pdf> Feb. 16, 2006, retrieved from Internet Archive Wayback Machine <https://web.archive.org/web/20060216212519/http://www.swagelok.com/downloads/webcatalogs/en/MS-02-230.pdf> on Sep. 16, 2016.*

(Continued)

*Primary Examiner* — Mary McManmon
*Assistant Examiner* — Richard K Durden
(74) *Attorney, Agent, or Firm* — Kwan & Olynick LLP

(57) ABSTRACT

The present disclosure provides a lightweight two-stage pressure regulator for controlling the flow of gas from a high pressure source. The two stage pressure regulator comprises a gas inlet, a first piston pressure regulator stage, a second piston pressure regulator stage and a gas outlet. The first piston pressure regulator stage and the second piston pressure regulator stage are arranged to be coaxial such that the gas flow path is substantially along the axis of the first and second piston regulator stages.

19 Claims, 6 Drawing Sheets

(51) Int. Cl.
  *B64D 41/00* (2006.01)
  *B64D 37/30* (2006.01)
  *B64C 39/02* (2006.01)

(52) U.S. Cl.
  CPC ............ *B64C 39/024* (2013.01); *B64D 37/30* (2013.01); *B64D 2041/005* (2013.01); *Y10T 137/7795* (2015.04)

(56) References Cited

U.S. PATENT DOCUMENTS

| | | | |
|---|---|---|---|
| 6,626,204 | B2 | 9/2003 | Akira et al. |
| 7,806,365 | B2 * | 10/2010 | Miller .................... B64C 39/024 244/135 R |
| 2007/0017524 | A1 | 1/2007 | Wilson et al. |
| 2008/0011361 | A1 * | 1/2008 | Larsen ................. G05D 16/103 137/528 |
| 2009/0071550 | A1 | 3/2009 | Patterson et al. |
| 2012/0181287 | A1 * | 7/2012 | Holbeche ................ F17C 13/04 220/582 |

FOREIGN PATENT DOCUMENTS

| | | | | |
|---|---|---|---|---|
| GB | 816756 | A | 7/1959 | |
| WO | WO 0159342 | A1 * | 8/2001 | ......... G05D 16/0672 |

OTHER PUBLICATIONS

Jewett, R. P., R. Walter J., W. Chandler T., and R. Frohmberg P. "Hydrogen Environment Embrittlement of Metals." NASA Contractor Report (Mar. 1973): NASA Technical Reports Server. Web. Sep. 18, 2016. <http://ntrs.nasa.gov/archive/nasa/casi.ntrs.nasa.gov/19730012717.pdf>.*
"European Application Serial No. 13382525.7, Extended European Search Report mailed Aug. 19, 2014", 5 pgs.
"Canadian Application Serial No. 2,866,249, Office Action mailed Feb. 27, 2017", 5 pgs.
Hambling, David, "Longer-Lasting Drones Powered by Fuel Cells", Retrieved from the Internet: http://www.popularmechanics.com/military/a8956/longer-lasting-drones-powered-by-fuel-cells-15425554/, May 3, 2013, 4 pgs.

* cited by examiner

LIGHTWEIGHT GAS PRESSURE REGULATOR

CROSS-REFERENCE TO RELATED APPLICATIONS

This application claims priority under 35 U.S.C. §119 to European Patent Application No. 13382525.7, filed 18 Dec. 2013 the disclosure of which is incorporated herein by reference in its entirety for all purposes.

FIELD OF THE DISCLOSURE

The present disclosure relates to gas pressure regulators and more specifically to lightweight hydrogen pressure regulators suitable for use in unmanned aerial systems (UAS) or other fuel cell powered vehicles.

BACKGROUND SECTION

The present disclosure relates to a lightweight two stage pressure regulator that may be used in many different applications where there is a requirement to control the flow from a high pressure gas supply. However, a contemplated application for the two stage pressure regulator of the present disclosure is in connection with a hydrogen gas supply to a fuel cell in an unmanned air system. Hence, the following description presents the disclosure in this context, it being understood that this is by way of example only. Mini unmanned aerial vehicles (UAVs) are an emerging technology for low altitude surveillance. The use of hydrogen fuel cells to power mini-UAVs is particularly attractive because of the following properties: high energy density, reduced charge time, low environmental impact (water is the only by-product), low noise, low thermal signature, low vibration and high reliability.

Ideally, gaseous hydrogen is stored in the UAV in a pressurised tank. The pressure in the hydrogen gas tank is typically 300 barg/4500 psig (30 MPa). However, the operating pressure of a hydrogen fuel cell is typically around 0.4-0.6 barg/6-9 psig (140 kPa-160 kPa). For this reason, a hydrogen pressure regulator is needed to reduce the pressure safely from the storage pressure to the pressure needed for use.

State-of-the-art pressure regulators for fuel cell applications usually comprise two separate regulation steps to reduce the pressure of compressed hydrogen from the storage pressure to around 0.4-0.6 barg (140 kPa-160 kPa). This can be achieved either by two separate regulators or preferably by using an integrated two-stage regulator. However, these two-stage pressure regulators are very heavy at around 2 kg, and are very bulky. In a mini-UAV, both weight and volume are limited, and so it is not presently feasible to use such regulators. For instance, the typical maximum take-off weight (MTOW) of a mini-UAV is only 5-15 kg so it is not feasible to use a pressure regulator with a mass as high as 2 kg.

FIG. 1 shows a schematic diagram of an example of such a commercially available two-stage regulator from the Swagelok® KCY series of regulators. As can be seen, the regulator relies on a back-to-back arrangement of first and second diaphragm-type regulator stages 30 and 40. Gas inlet 10 is connected directly to a small chamber in the first regulator stage 30 in which a poppet 31 can move. The poppet 31 is connected through a channel to large diaphragm 34 in a second chamber. A first stage swing 35 pushes down on the diaphragm 34 and so biases the poppet 31 in an open position. When a gas, such as hydrogen, under pressure is introduced into the gas inlet 10, the gas can flow freely past the poppet 31 and into the diaphragm chamber. A build-up of pressure from the gas in the diaphragm chamber leads to a force on the diaphragm 34 which starts to compress the spring 35. The diaphragm 34 will deflect slightly under the pressure and will bias the poppet 31 towards the closed position, thereby throttling the gas flow.

For very high pressures, the poppet 31 is pushed against a seat 32 in the poppet chamber so as to stop the flow of gas into the diaphragm chamber. This prevents any further build up of pressure in the diaphragm chamber. In this manner, the pressure in the diaphragm chamber is kept regulated at a desired pressure that is much lower than the inlet pressure of the gas. The regulated pressure from the first regulator stage can be controlled by tightening a stem nut 36 which adjusts a pre-compression of the first stage spring 35, although this is normally factory set.

From the diaphragm chamber of the first regulator stage, the gas flows at the reduced pressure along a connecting channel 50 to the second regulator stage 40. The gas flows into a second poppet chamber whereby the pressure is further reduced in much the same way as the pressure was reduced in the first regulator stage 30. A second diaphragm 44 is biased by a second stage spring 45 in an open position, but deflects under gas pressure to bias a poppet 41 towards the closed position against a seat 42, thereby throttling the gas flow. For very high pressures, the poppet 41 closes against its seat 42. The gas leaves the second diaphragm chamber at an even lower pressure and flows along an outlet channel 60 to the gas outlet 20.

Note that in this model, the final pressure of the gas flowing out of the gas outlet can be adjusted by turning a handle connected to the stem nut 46, which alters the compression on the second stage spring 45. Therefore, the regulator allows a high pressure gas source to be used to provide a controllable low pressure flow of gas.

This type of two stage regulator using two diaphragm regulator stages can handle a typical input pressure of 250 barg/3600 psig (25 MPa) and provide a controllable outlet pressure in the range 0-7 barg/0-10 psig (100 kPa-170 kPa). However, the weight of such a regulator is typically 1.9 kg, which is far too heavy for use in mini-UAV applications. Further, the back-to-back arrangement of the regulator stages causes the regulator to be rather large, making it difficult to fit into the small volume of a mini-UAV. Further pipe connections and optional pressure gauges may be added in addition to the regulator, adding even more weight and more volume to the regulator system.

The need for the back-to-back arrangement of the diaphragm regulator stages requires a convoluted gas path through the two-stage regulator. The gas flow must travel first to the first regulator stage 30 at one end of the two-stage regulator, and then be diverted all the way to the opposite end of the two-stage regulator to the second regulator stage 40. This convoluted path adds further bulk and weight to the regulator.

Therefore, there is a need for a compact and lightweight pressure regulator that is suitable for reducing the pressure of hydrogen gas in a storage canister to the pressure required for use in a hydrogen fuel cell.

Further, it would be useful if the regulator could be fitted directly to the hydrogen gas cylinder, such that the space that the hydrogen system occupied could be reduced still further. This would also increase safety when the regulator is used inside a vehicle since it avoids having high pressure pipelines inside the vehicle.

SUMMARY OF DISCLOSURE

According to the present disclosure, there is provided a two-stage pressure regulator for controlling the flow of gas from a high pressure source according to claim 1.

The two stage pressure regulator comprises a gas inlet arranged to receive gas from a high pressure source, a first piston pressure regulator stage in fluid communication with the gas inlet, a second piston pressure regulator stage in fluid communication with the first piston pressure regulator stage and a gas outlet in fluid communication with the second piston pressure regulator stage. The first piston pressure regulator stage and the second piston pressure regulator stage are arranged to be coaxial such that a first piston of the first piston pressure regulator stage and a second piston of the second piston pressure regulator stage move in a common direction.

The pressure regulator of the present disclosure is compact and lightweight because of the proximity and arrangement of the first and second pressure regulator stages. In one embodiment, the total weight of the pressure regulator is 256 g, which is a significant improvement on the prior art regulators which are generally around 2 kg. This is achieved by using an advantageous gas flow path thorough the pressure regulator stages. Both regulator stages are of the piston type and the gas flows linearly through the regulator-stage from one side to the other. This allows the two such stages to be stacked on top of each other with only a very small connecting channel needed between the first and second regulator stages. As will be appreciated, this results in a very compact arrangement.

The arrangement of having the first and second piston pressure regulator stages does not have to be exactly coaxial. Preferably, the first piston pressure regulator stage and the second piston pressure regulator stage are arranged to be substantially co-axial. It should be understood that small deviations from being coaxial will still provide the above-mentioned advantages over the prior art regulator stages. In particular, a small displacement of the longitudinal axes of the first and second piston pressure regulator stages—for example by 10 mm or less, by 5 mm or less or by 2 mm or less—would still fall within the scope of the disclosure. Such a small offset would still provide a design that is compact. Further, a design in which the longitudinal axes were inclined relative to one another, but the motion of the pistons was still in a substantially similar direction so as to be compact for the reasons given above would also still fall within the scope of the disclosure. For example, the longitudinal axes of the first and second piston pressure regulator stages may be inclined by 15° or less, by 10° or less or by 5° or less. The longitudinal axes of the first and second piston pressure regulator stages may be both offset and inclined, for example by any of the values indicated above.

This linear flow of the gas through the pressure regulator stages is not possible with the prior art diaphragm type regulators described above, since the gas remains on one side of the diaphragm, meaning that the inlet and outlet of the diaphragm regulator stage cannot be aligned.

The pressure regulator of the present disclosure has a wide range of applications, but is particularly advantageous for mini-UAV applications, where space and weight are very important factors.

Optionally, the two-stage pressure regulator comprises a pressure sensor arranged to measure remotely the amount of the gas inside the gas cylinder.

Optionally, the two-stage pressure regulator further comprises a quick-fill connector arranged to allow the gas cylinder to be refilled. This may provide enhanced safety since the dry-break quick fill connector generally will not allow disconnecting a flexible inlet refueling pipe while it is pressurized. A further advantage of the quick fill connector is that the gas cylinder and pressure regulator do not need to be removed from the vehicle in order to refill the gas cylinder. This could be useful in situations in which the gas cylinder and the pressure regulator are located in a tight space, and removal for refueling is not easy, for example in a mini-UAV. This also allows, for example, the gas cylinder to be refilled on the ground without requiring removal of the regulator from a UAV and without having to add any extra high pressure fittings and refilling attachments.

Optionally, the two-stage pressure regulator further comprises a two-way valve arranged to open/close the gas flow from the gas cylinder through the regulator towards the fuel cell or to allow refilling the gas cylinder. A non-return valve in a quick connector may be used to close the tank refueling inlet during normal operation.

Optionally, the two-stage pressure regulator comprises a rupture disc arranged to release the pressure of the gas if it exceeds a predetermined threshold level. This provides a safety mechanism against dangerously high gas pressures that may damage the regulator second stage if the first stage fails. The compact nature of the two-stage regulator allows that this safety features can be integrally formed with the regulator, and therefore does not take up excessive bulk by needing to be connected separately.

Optionally, the two-stage pressure regulator is adapted to regulate the pressure of hydrogen gas delivered by a hydrogen gas supply.

Optionally, the two-stage pressure regulator is made substantially from titanium or a titanium alloy, preferably a non hydrogen embrittleling titanium alloy. The advantage of using titanium is that titanium is very strong yet has a light weight. Consequently, the overall weight of the pressure regulator can be reduced whilst still being strong enough for use.

As already mentioned, a particular application of the present disclosure is in the powering of hydrogen fuel cells for mini-UAVs. The specific limit on weight and space in a mini-UAV requires that a pressure regulator is lightweight and compact. Pressure regulators forming the prior art are not suitable for this applications, whereas the present disclosure is perfectly suited.

BRIEF SUMMARY OF THE DRAWINGS

Preferred embodiments of the present disclosure shall now be described, by way of example only, with reference to the accompanying drawings, in which.

DETAILED DESCRIPTION OF THE EMBODIMENTS

Figure 1:
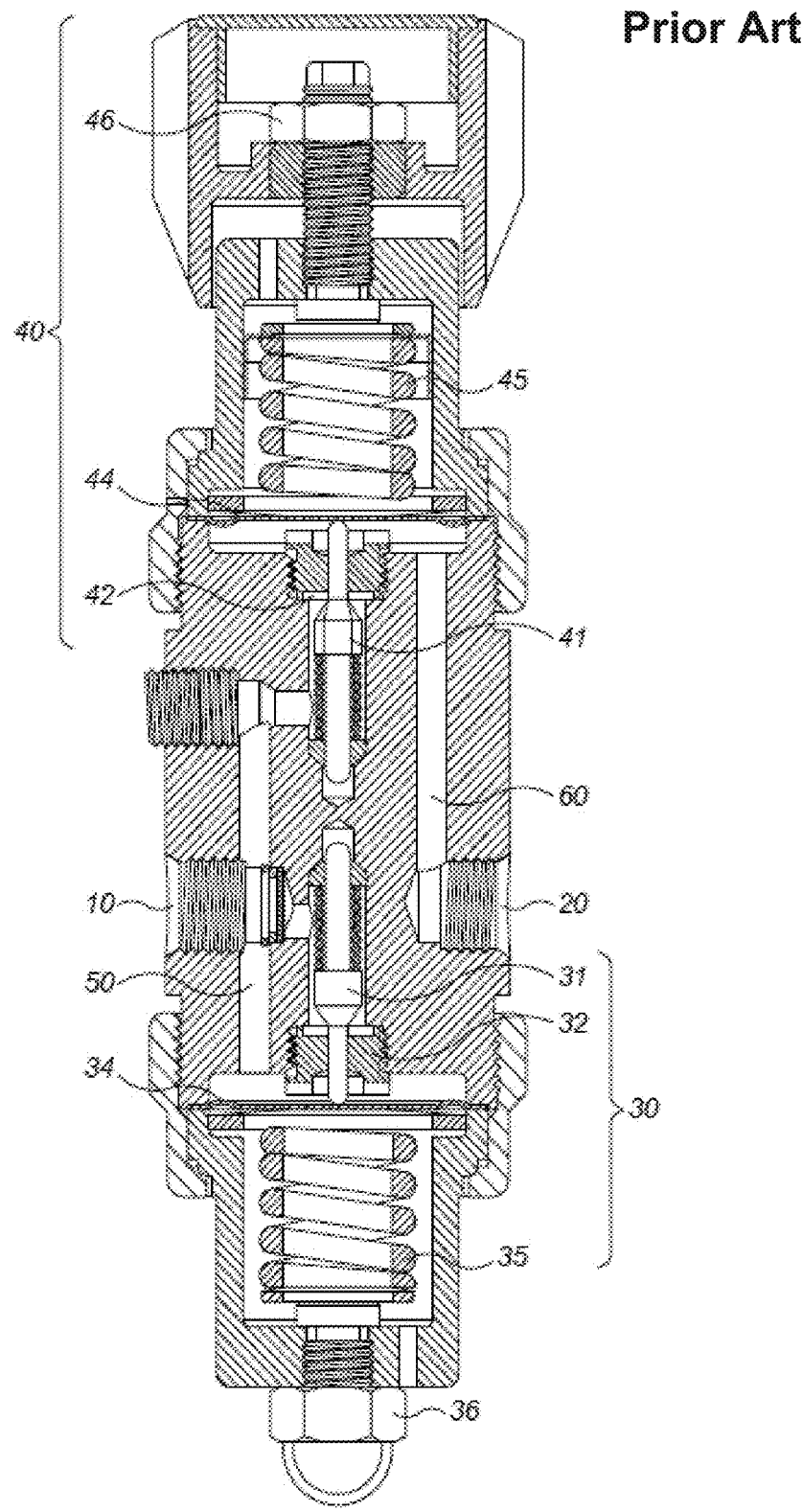
FIG. 1 is a part-perspective, part-sectional view of a prior art regulator.

Although enjoying wide applicability, the present disclosure will now be described with reference to exemplary embodiments in the context of a pressure regulator to connect a gas cylinder to a fuel cell system within an unmanned air vehicle, such as that shown in FIG. 6. It will be understood that pressure regulators according to the present disclosure may be used in many other contexts.

FIGS. 2 to 5 show a pressure regulator 300 according to an embodiment of the present disclosure. The pressure regulator 300 comprises:

a connector 210 to allow the pressure regulator 300 to be connected to the neck of the gas cylinder 310, a dry-break quick fill connector 220 to allow the gas cylinder 310 to be re-filled without having to add any extra high pressure fittings or refilling attachments.

a double pressure regulating stage 100 to reduce the high pressure of the hydrogen gas in the gas cylinder 310 to the low pressure required at the fuel cell inlet, a pressure sensor 200 to sense the pressure of the hydrogen gas inside the gas cylinder 310, a small low weight two-way valve 230 to open/close the gas flow from the gas cylinder 310 through the pressure regulator 300 towards the fuel cell or to allow refilling of the gas cylinder 310, and a rupture disk 250 to avoid a dangerous build-up of pressure, that could damage the second pressure regulation stage of the regulator 140.

Figure 3:
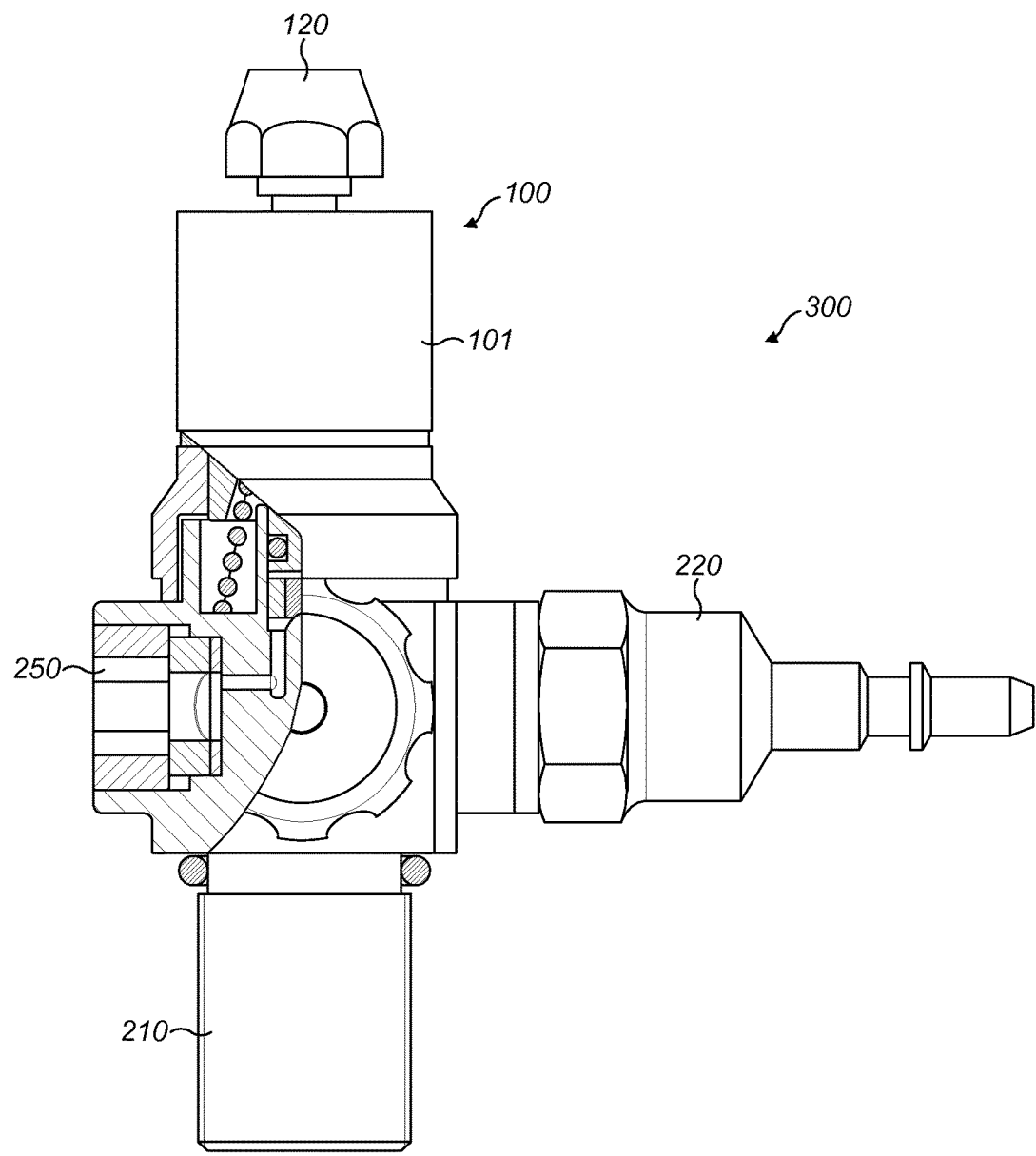
FIG. 3 is a part-perspective, part-sectional view of an embodiment of the present disclosure, showing a second section of part of the regulator.
Figure 4:
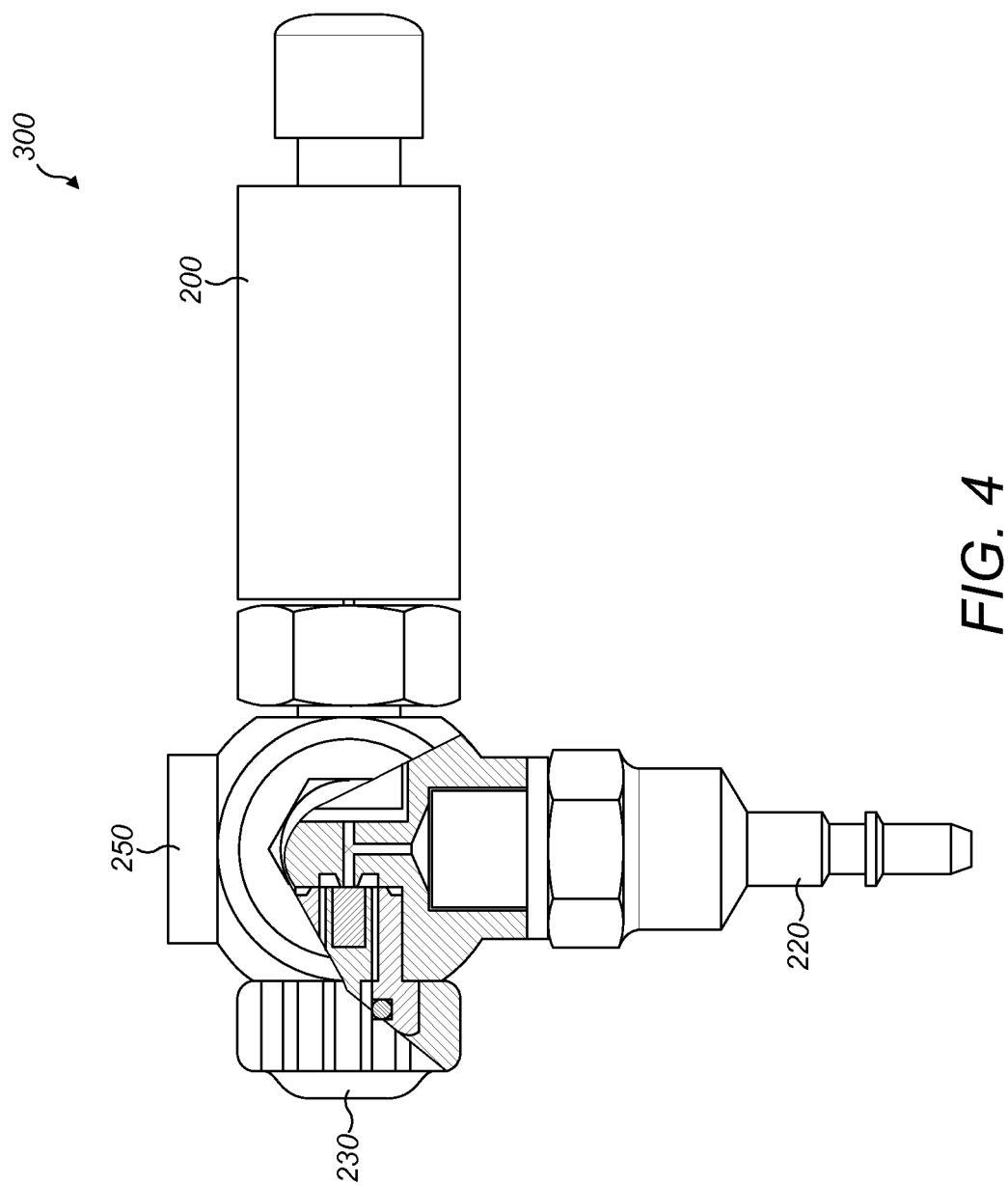
FIG. 4 is a part-perspective, part-sectional view of an embodiment of the present disclosure, showing a third section of part of the regulator.
Figure 5:
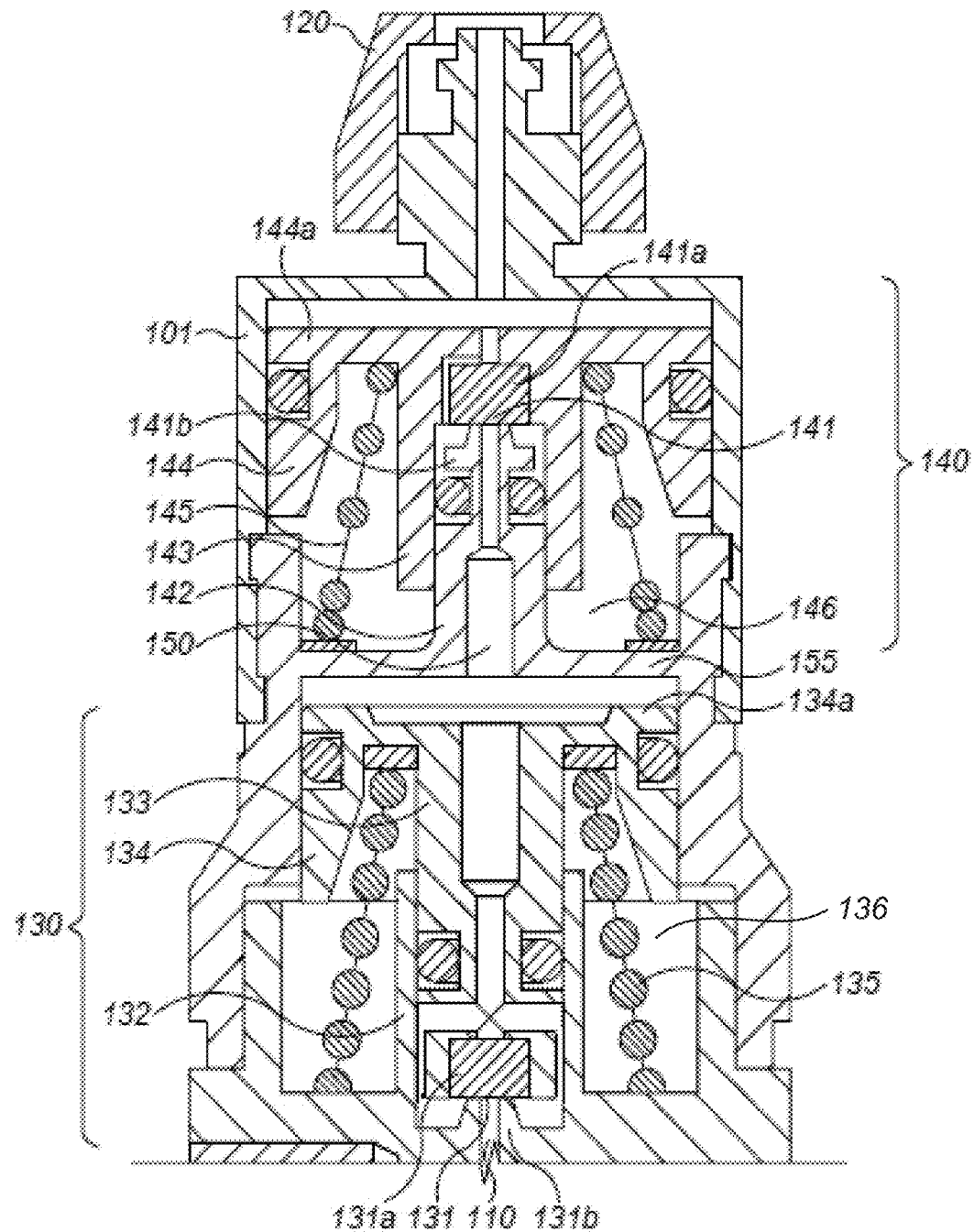
FIG. 5 is a part-perspective, part-sectional detail taken from the regulator of FIG. 2.

FIGS. 3 to 5 show this embodiment of the present disclosure from differing angles, and between them show the relative arrangement of the pressure regulating portion 100, the pressure sensor 200, the connector 210, the dry-break quick fill connector 220, the two-way valve 230, and the rupture disk 250.

Figure 2:
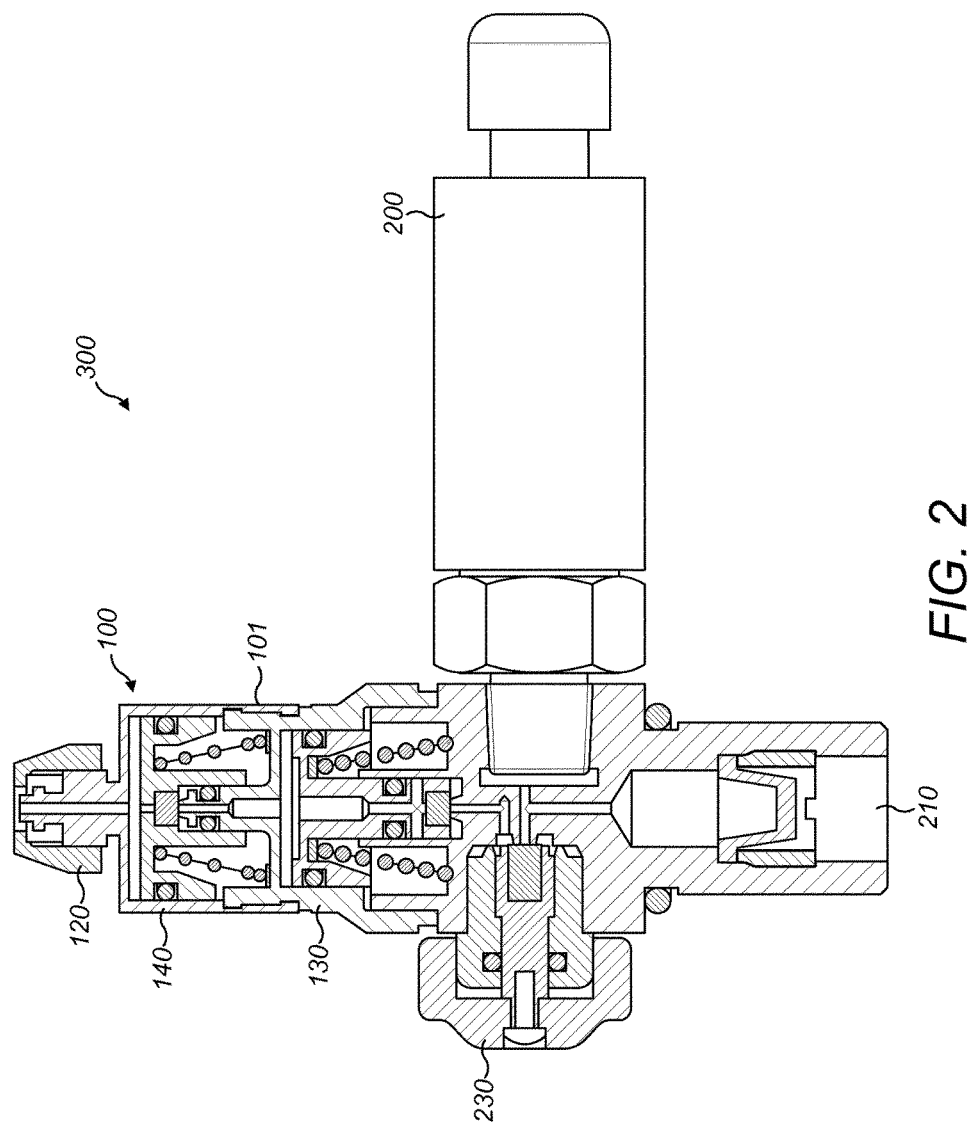
FIG. 2 is a part-perspective, part-sectional view of an embodiment of the present disclosure, showing a first section of part of the regulator.

As shown in FIGS. 2, 3, and 4, the gas regulator 300 according to the present disclosure has a very compact design yet still incorporating several safety features missing in the prior art pressure regulator of FIG. 1. The pressure regulating portion 100 comprises two stacked in-line piston type pressure regulation stages that significantly reduce the overall length, bulk and weight when compared to the prior art, allowing further safety features such as the pressure sensor 200 and the rupture disk 250 to be added to increase the safety of the regulator 300.

The gas regulator 300 comprises a connector 210 that receives hydrogen gas from the gas cylinder 310. The connector 210 and the gas inlet 110 to the double pressure regulating stage 100 (FIG. 5) are connected when the two way valve 230 closes that gas path. The gas inlet 110 defines the start of a gas path through the gas regulator 300 that sees the hydrogen gas travel to the gas inlet 110, to a first pressure regulating stage 130, to a second pressure regulating stage 140 and finally to a gas outlet 120 from where the gas is delivered, either directly to a connected fuel cell or to a further conduit to convey the hydrogen gas to the fuel cell.

The double pressure regulating stage 100 is formed from the two pressure regulating stages 130 and 140 that comprise a pair of piston chambers 136 and 146 separated by a thin wall 155. The two piston chambers 136 and 146 are arranged in an inline or coaxial manner, or at least substantially coaxial, to reduce the overall length and bulk of the double pressure regulation stage 100. For example, as shown in FIG. 5, the double pressure regulating stage 100 is formed of a substantially cylindrical body with a centrally located, transversely extending wall 155 to separate the cylindrical body into the first and second piston chambers 136 and 146. Advantageously, the thin separating wall 155 defines a very short channel 150 that connects the first pressure regulating stage 130 to the second pressure regulating stage 140. This design differs from the prior art of FIG. 1 whose back to back arrangement of diaphragms necessitates a long and convoluted path through the regulator. The in-line piston design of the present disclosure allows the whole pressure regulating portion 100 to be greatly reduced in bulk and length, also providing an associated reduction in mass.

The first and second pressure regulating stages 130 and 140 are of essentially the same design and function in essentially an identical manner, and both of which act to reduce the pressure of the hydrogen gas that flows into the inlet 110 before it is expelled at the outlet 120. Their physical layout may differ slightly for ease of manufacture and assembly.

The pressure regulating stages 130 and 140 each comprise the piston chamber 136, 146 with a piston inlet and a piston outlet arranged on opposite sides of a piston 134, 144. A gas flow path is provided between the piston inlet and the piston outlet side of the first piston chamber 136 by a hollow stem 133 of the piston 134. The gas flow through each pressure regulating stage 130 and 140 is throttled by a build up of pressure on the outlet side of the piston chamber 136, 146 causing the piston 134, 144 to move within the piston chamber 136 and 146 and so to throttle a valve 131, 141 provided in the piston inlet. The valves 131, 141 are shown in their closed positions in FIG. 5.

In more detail, both pressure regulating stages 130 and 140 comprise piston chambers 136 and 146, each containing a piston 134, 144 with a piston head 134*a*, 144*a* and a piston stem 133, 143, with a hollow bore extending through the piston head 134*a*, 144*a* and piston stem 133, 143. The piston stem 133, 143 connects directly to the piston inlet and to the outlet side of the piston chamber 136, 146. In the embodiment shown in FIG. 5, the pistons 134 and 144 are aligned coaxially so that the piston heads 134*a* and 144*a* face the same direction along the longitudinal axis of the cylindrical body 101. Each piston head 134*a*, 144*a* separates their respective piston chambers 136 and 146 into inlet and outlet sides. These sides are isolated from each other so that the hydrogen gas cannot pass between them. Piston ring seals may be used to ensure that the inlet and outlet sides are completely isolated from each other. The inlet sides are not connected to the gas path through the gas regulator 300. The inlet side of each piston chamber 136 and 146 may be open to the atmosphere or may be completely sealed. The hollow bore that extends through the piston 134, 144 exits into the outlet side of each piston chamber 136 and 146. Both piston heads 134*a* and 144*a* are biased away from their respective inlet sides by respective helical springs 135 and 145. Of course, other forms of biasing means could be used, as the skilled person would fully understand.

Gas enters each of the pressure regulating stages 130 and 140 via the piston inlet and passes through the hollow bore in the piston 134, 144 to enter the outlet side of the piston chambers 136 and 146. A build-up of gas pressure in the outlet side of each piston chamber 136 and 146 provides a force on the piston head 134*a*, 144*a* that urges the piston 134, 144 to move against the spring 135, 145. When the gas pressure in the outlet side increases, the force on the piston head 134*a*, 144*a* pushing against the spring 135, 145 also increases. As the inlet side of the pressure chamber 136, 146 is isolated from the outlet side, the increase in gas pressure is not seen by the inlet side. Thus, the resultant force causes the piston 134, 144 to move towards the inlet side to compress the spring 135, 145.

The pressure regulating stages 130 and 140 are arranged so that when the pressure in the outlet sides of each piston chamber 136, 146 increases, the piston 134, 144 moves to throttle the flow of gas through the pressure regulating stage 130, 140. As can be seen in the figures, the valve 131, 141 is provided by the piston stem 133, 143 where it meets the piston inlet. Furthermore, when the pressure in the outlet side reaches a preset threshold, the corresponding movement of the piston causes the valve 131, 141 to close completely and prevent further flow of gas, as illustrated in FIG. 5. The valve 131, 141 could take many forms, but the figures show one possibility where a valve seal 131*a*, 141*a* is formed by the underside of the piston stem 133, 143 being urged against a valve seat 131*b*, 141*b* formed around the piston inlet 110. As the piston stem 133, 143 moves towards the valve seat 131*b*, 141*b*, the orifice formed between the piston inlet and the hollow bore of the piston stem 133, 143 through the piston 134, 144 is progressively narrowed, thereby throttling the flow of gas through the pressure regulating stages 130 and 140.

The operation of the first pressure regulator stage 130 to regulate the pressure of an incoming gas flow shall now be described. With no initial gas pressure in the outlet side of the piston chamber 136, the spring 135 biases the first piston 134 away from the gas inlet 110, so that the valve seal 131*a* at the end of the first piston stem 133 is well away from the valve seat 131*b* formed around the gas inlet 110 and hence the valve 131 is fully open. Therefore, the flow of gas from the gas inlet 110 is unimpeded. When a gas flow is then introduced by opening the gas cylinder, the gas flows through the gas inlet 110, through the first piston inlet, through the first piston stem 133 and into the outlet side of the piston chamber 136. The gas pressure in the outlet side starts to rise, and the corresponding increase in the force exerted on the first piston head 134*a* causes the piston 134 to move towards the piston inlet. This compresses the spring 135 and moves the valve seal 131*a* closer to the valve seat 131*b*. Eventually, the first piston 134 moves far enough under the influence of the pressure in the outlet side for the orifice between piston stem 133 and the valve seat 131*b* to narrow enough for a drop in gas flow to be observed. Eventually, the orifice is narrowed sufficiently such that the pressure in the outlet side is at the desired level and equilibrium is reached such that the piston 134 maintains its position, as determined by the resistance of the spring 135.

Thus, the pressure regulating stage 130, 140 is self-regulating. An increase in gas supply pressure tends to cause an increased gas flow that would see an increase in pressure at the outlet side of the piston chamber 136. This provides a tendency for the piston 134 to move towards the inlet side: however, this movement immediately closes the orifice further thereby causing the required drop in gas flow. Conversely, a drop in gas supply pressure tends to cause a decreased gas flow that would see a decrease in pressure in the outlet side of the piston chamber 136. This provides a tendency for the piston 134 to move away from the inlet side due to the spring 135; however, this movement immediately opens the orifice further thereby allowing the required increase in gas flow.

Should highly excessive pressure be exerted by the gas from the gas cylinder 310, the pressure in the outlet side of the pressure chamber 136 can become high enough to force the valve stem 133 fully against the valve seat 131*b* and so cut off the flow of gas from the gas inlet 110. Then, pressure on the outlet side of the piston chamber 136 will be relieved as gas either flows from the first pressure regulating stage 130 to the second pressure regulating stage 140, or from the second pressure regulating stage 140 to the gas outlet 120. This drop in pressure on the outlet side will cause the piston 134 to move away from the inlet side and so open the valve 131 once more.

The above described actions of the first and second pressure regulating stages 130 act to reduce the gas pressure to a predetermined lower level. The two stages 130 and 140 provide a two-stage step-down from the high pressure of the gas cylinder 310 to the required low pressure to supply to the fuel cell. This predetermined lower level of each stage 130 and 140 can be set during manufacture by various means, including using different strengths of springs, or other biasing means, or by changing the distances the piston assembly must move in order close the closing means.

Means are provided to help guide movement of the pistons 134 and 144 within the piston chambers 136 and 146. Each piston head 134*a* and 144*a* is provided with a thickened circumferential edge to provide greater overlap between the piston head 134*a*, 144*a* and the adjacent chamber wall. Each piston stem 133 and 143 is also guided. In the first pressure regulating stage 130, the base of the first piston chamber 136 has an annular wall 132 sized such that its internal bore provides a channel in which the first piston stem 133 moves. A seal may be provided between the piston stem 133 and the annular wall 132 to ensure that gas cannot leak from the piston inlet into the inlet side of the first piston chamber 136. In the second pressure regulating stage 140, the piston stem 144 has a wider bore and forms a collar around a raised column 142 connected to the separating wall 155, through which the connecting channel 150 communicates the gas to the second piston chamber 146. A second valve 141 is located between the top of the raised column 142 and the inside of the piston stem 143, and works in essentially the same way as the first valve 131. That is, as the pressure increases in the outlet side of the piston chamber 146, the rising pressure causes the piston 144 to move against the biasing means 145. This causes the orifice formed in the valve 141 to narrow, thereby restricting the gas flow into the second piston chamber 146.

The outlet of the second pressure regulating stage is the gas outlet 120 of the whole pressure regulator 300. In the embodiments shown in the figures, a nozzle forms the gas outlet 120 of the pressure regulator 300, in order that that tubing can be attached to connect the low pressure gas to the fuel cell. A collar may be used to fix the tubing in place. Of course, other forms of outlet ports could be used.

The overall weight of the above described pressure regulator 300 may be reduced further by making the body of the regulator 300 out of titanium alloys. Prior art hydrogen pressure regulators are not usually made out of titanium alloys due to concerns of hydrogen embrittlement caused by the small-size hydrogen atoms diffusing into the titanium metal structure. Coupled with the fact that in most industrial uses of hydrogen regulators, there is no need for making the regulator particularity compact and lightweight, titanium is not generally used. Instead, prior art hydrogen pressure regulators are usually made of stainless steel alloys or brass. The problem of hydrogen embrittlement is mitigated in this particular case due to the pressure regulator not being exposed to high temperatures when in use, unlike in many other industrial applications.

Figure 6:
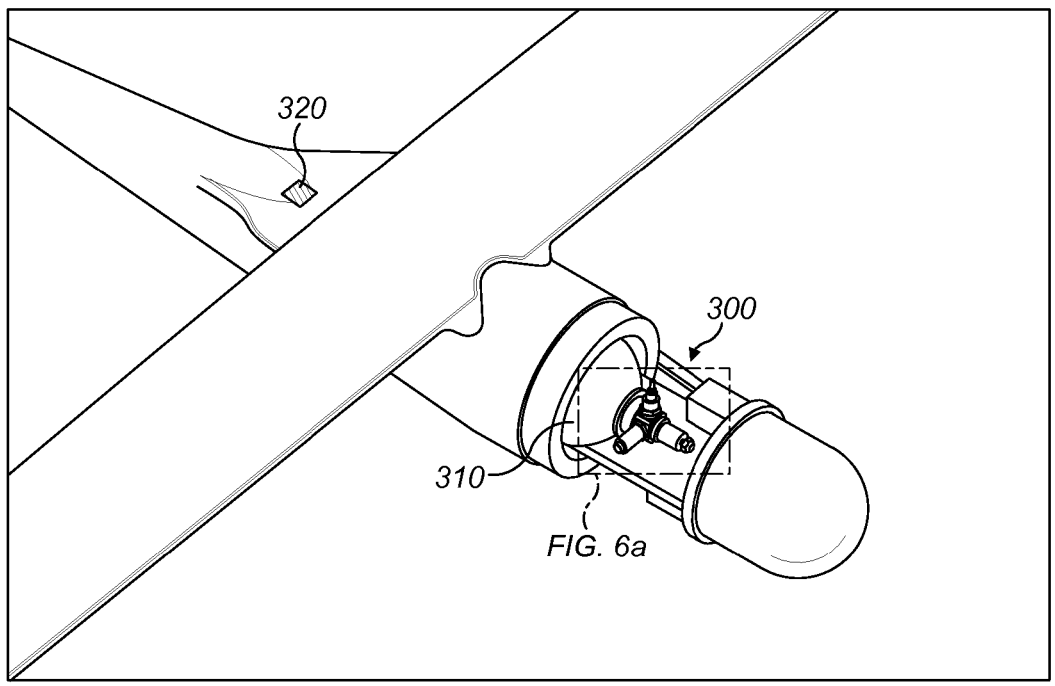
FIG. 6 is a diagram of a regulator fitted to a gas cylinder and supplying fuel to a hydrogen fuel cell, including a detail shown as FIG. 6*a*.
Figure 6A:
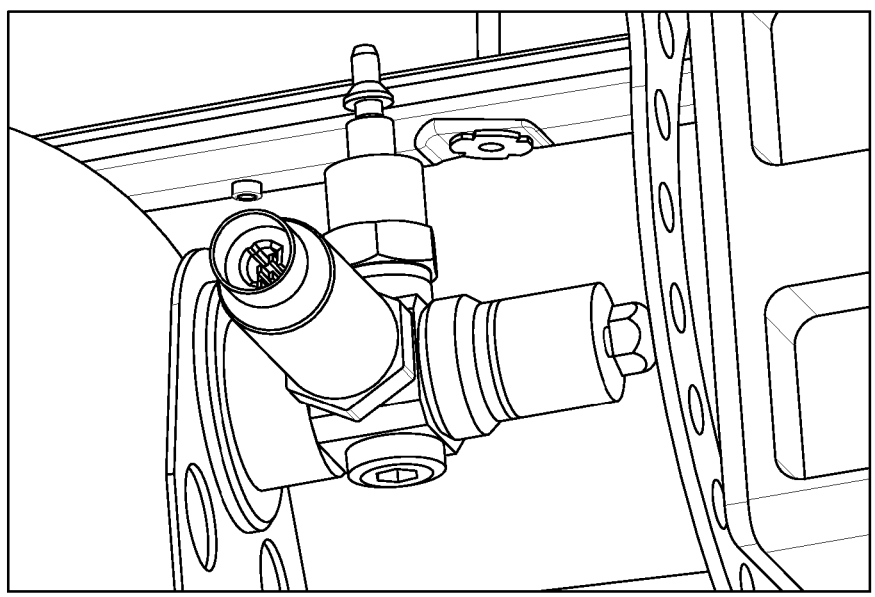

As mentioned earlier, further optional adaptations of the device can add to the utility for use in a mini UAV system 320, as shown in FIG. 6. For example, a pressure sensor 200 for sensing the pressure of hydrogen gas in the gas cylinder 310, a two-way valve 230 to open/close the gas flow from the gas cylinder 310 through the regulator 300 towards the fuel cell or to allow refilling of the gas cylinder 310, a connector 210 to connect the regulator 300 to the gas cylinder 310, a dry-break quick fill connector 220 to allow the gas cylinder 310 to be re-filled, without having to add any extra high pressure fittings or refilling attachments, and a rupture disk 250 for preventing a dangerous build up of pressure that could damage the second regulation stage 140.

A rupture disk 250 is a safety device comprising a disk of material that will rupture if the pressure difference across it becomes greater than a threshold level. This can be used as a safety valve, such that the disk will rupture and vent the internal gas if the pressure becomes too high.

Further, by incorporating a connector 210 to connect the regulator 300 to the gas cylinder 310, the regulator can be fitted directly onto a hydrogen gas cylinder 310 neck, thereby eliminating the need for high pressure piping that adds both weight and bulk to the pressure regulator system 300, along with safety concerns of having high pressure piping on board of the UAV which might rupture and leak in a confined space. For convenience, a dry-break quick fill connector 220 may be added to allow the hydrogen gas cylinder 310 to be refilled without having to add any extra high pressure fittings or refilling attachments.

The pressure regulator of the present disclosure can be fitted directly onto the neck a gas cylinder 310 in order for the system to be as safe and as compact as possible. This is particularly useful in the tight confines of a UAV 320, in which there is very little spare space. FIG. 6 shows the pressure regulator 300 coupled directly onto the neck of a hydrogen cylinder 310 in the fuselage of a UAV 320, with the outlet of the pressure regulator coupled to the hydrogen fuel cell system used to power an electric motor. As shown, the unique co-linear design of the pressure regulation stage 100 allows for a significant space saving in the UAV system 320. The dry-break quick fill connector 220 allows the hydrogen cylinder 310 to be refilled easily without the need to dismantle the pressure regulator 300 and cylinder 310 assembly from the aircraft 320, and without having to add any extra high pressure fittings or refilling attachments.

The system further allows the in-situ monitoring of the pressure within the hydrogen cylinder 310 using an integrated pressure sensor 200.

Although embodiments have been disclosed in detail, a person skilled in the art will appreciate that not all features of each disclosed embodiment are essential for carrying out the disclosure, the features which define the disclosure being set out in the appended claims. The features of certain examples, aspects and embodiments may be combined and/or interchanged with those of other examples, aspects and embodiments, where appropriate as would be understood by a person skilled in the art. The person skilled in the art will further appreciate that variations may be made to the above described embodiments without departing from the scope of the disclosure defined by the appended claims.

It will be appreciated that the disclosure has applications in multiple fields, not just those mentioned in the description. The skilled person would recognise that the lightweight and compact design of the present disclosure could provide an advantage in many other applications, and not just to hydrogen regulation for UAVs 320. As an example, the present disclosure could also be used in the emergency oxygen system of commercial aircraft. The replacement of standard regulation systems with the lightweight regulator described in this document would contribute to a weight reduction, fuel savings and $CO_2$ emission reduction. For example, the emergency oxygen system of a Boeing 737 aircraft comprises a chemical passenger oxygen system for 12 minutes (optionally 22 minutes) and a flight crew oxygen system. Both systems use standard pressurised gas cylinders to provide the oxygen. A typical configuration includes two standard 76 cu. ft. (2.2 $m^3$) cylinders for passengers and one or two additional cylinders for crew, depending on the number of crew in the cabin. Assuming a total of four oxygen cylinders onboard, a weight reduction of around 5 kg could be achieved by simply replacing the conventional pressure regulators with regulators according to the present disclosure.

Several airlines have estimated that each kilogram of weight reduced in the aircraft could save between 0.02 and 0.04 kg of fuel per hour. Assuming an average aircraft life of 100,000 hours, each kilogram of weight saved could save 4 tonnes (4,000 kg) of fuel along the aircraft service life and avoid the emission of 12.5 tonnes (12,500 kg) of $CO_2$. Therefore, since the pressure regulator of the present disclosure provides a weight reduction of 5 kg per aircraft, the use of the present disclosure would save 20 tonnes (20,000 kg) of fuel, avoid the emission of 63 tonnes (63,000 kg) of $CO_2$, and save around US$20,000 (taking into account the current aviation fuel price) for each civil aircraft along its service life.

As mentioned earlier, the disclosure relies on a substantially coaxial arrangement of the first and second piston pressure regulator stages. However, is should be understood that the longitudinal axes do not need to be exactly coaxial. The scope of the disclosure includes minor deviations from the axes being coaxial such that the design remains compact for the reasons described in the rest of the description. For example, the two longitudinal axes may be offset and/or inclined relative to each other.

It should be noted that there are other methods of forming the valve 131a, 141a that the skilled person would readily identify. The only limitation is that the valve 131a, 141a closes progressively when the piston 134, 144 moves in response to an increase in pressure in the outlet side of the piston chamber 136, 146. One alternative could be that the flow duct is formed axially throughout the piston stem 133 and has an opening on the base of the piston stem 133. A valve seal could be formed on the base of the piston chamber, with the inlet being off axis with the piston stem 133. Therefore, when the pressure reaches the threshold pressure, the opening at the base of the piston stem 133 will be forced against the valve seal on the base of the piston chamber 136, 146.

The invention claimed is:

1. A fuel-cell powered unmanned aerial vehicle (UAV) comprising:
   a pressurized tank comprising hydrogen;
   a fuel-cell comprising an inlet; and
   a two-stage pressure regulator for controlling a flow of the hydrogen from the pressurized tank to the fuel-cell, the pressure regulator comprising:
   a gas inlet connected to the pressurized tank;
   a first piston pressure regulator stage in fluid communication with the gas inlet,
      wherein the first piston pressure regulator stage comprises a first valve, an annular wall, and a first piston comprising a first piston head and a first piston stem, and wherein the annular wall comprises a first internal bore into which the first piston stem is slidably inserted;
a separating wall;
a second piston pressure regulator stage in fluid communication with the first piston pressure regulator stage;
wherein the separating wall is disposed between the first piston pressure regulator stage and the second piston pressure regulator stage,
wherein the second piston pressure regulator stage comprises a second valve, a column connected to the separating wall, and a second piston comprising a second piston head and a second piston stem,
wherein the second piston stem comprises a second internal bore into which the column is slidably inserted thereby the second piston stem forming a collar around the column, and
wherein the first valve is coaxial with the second valve; and
a gas outlet in fluid communication with the second piston pressure regulator stage and connected to the inlet of the fuel-cell.

2. The fuel-cell powered UAV of claim 1, wherein:
the first valve of the first piston pressure regulator stage comprises a first valve seat surrounding the gas inlet and further comprises a first valve seal disposed within the first internal bore between the first valve seat and the first piston stem,
the first piston stem extends from the first valve into a first piston chamber and is connected to the first piston head,
the first piston head divides a first piston chamber into a first inlet side and a first outlet side,
the first piston stem is hollow thereby to connect the first inlet side and the first outlet side, and
the first inlet side is in fluid communication with the first valve and the first outlet side is in fluid communication with a conduit extending into the second pressure regulator stage.

3. The fuel-cell powered UAV of claim 2, wherein:
the second valve of the second piston pressure regulator stage comprises a second valve seal and a second valve seat,
the second valve seat is a part of the column connected to the separating wall and is disposed within the second internal bore,
the conduit protrudes through the second valve seat,
the second piston stem extends from the second valve seal and is connected to the second piston head,
the second piston head divides a second piston chamber into a second inlet side and a second outlet side,
the second piston stem is hollow thereby to connect the second inlet side and the second outlet side,
the second inlet side is in fluid communication with the first outlet side by the conduit.

4. The fuel-cell powered UAV of claim 3, wherein the conduit connecting the first outlet side of the first piston chamber to the second inlet side is substantially straight.

5. The fuel-cell powered UAV of claim 3, wherein the conduit extends through the separating wall disposed between the first piston pressure regulator stage and the second piston pressure regulator stage.

6. The fuel-cell powered of claim 5, wherein a width of the separating wall disposed between the first piston pressure regulator stage and the second piston pressure regulator stage is less than both a length of first piston chamber and a length of the second piston chamber.

7. The fuel-cell powered UAV claim 1, wherein:
the first piston pressure regulator stage comprises a first helical spring biasing the first piston head towards the separating wall; and
the second piston pressure regulator stage comprises a second helical spring biasing the second piston head away from the separating wall.

8. The fuel-cell powered UAV of claim 7, wherein the first helical spring partially protrudes into a cylindrical channel formed by the first piston head together with the first piston stem.

9. The fuel-cell powered UAV of claim 1, further comprising a pressure sensor measuring pressure of the hydrogen in the pressurized tank.

10. The fuel-cell powered UAV of claim 9, further comprising a dry-break fill connector connected to the pressurized tank.

11. The fuel-cell powered UAV of claim 9, further comprising a valve arranged to shut off the flow of the hydrogen from the pressurized tank to the two-stage pressure regulator.

12. The fuel-cell powered UAV of claim 1, further comprising a rupture disc in fluid communication with the second piston pressure regulator stage.

13. The fuel-cell powered UAV of claim 1, wherein the two-stage pressure regulator is made substantially from titanium or a titanium alloy.

14. The fuel-cell powered UAV of claim 1, wherein the two-stage pressure regulator is arranged to regulate gas with an initial pressure in a range of 1 MPa to 30 MPa to a final pressure in a range of 140 kPa to 160 kPa.

15. The fuel-cell powered UAV of claim 1, wherein the first piston head forms a collar around the first piston stem thereby providing an extended overlap surface between the first piston head and a wall of the first piston pressure regulator stage.

16. The fuel-cell powered UAV of claim 1, wherein an inlet side of a piston chamber of each of the first piston pressure regulator stage and the second piston pressure regulator stage is open to atmosphere.

17. The fuel-cell powered UAV of claim 1, wherein the two-stage pressure regulator is supported by the pressurized tank and connected directly to the pressurized tank.

18. The fuel-cell powered UAV of claim 1, wherein the two-stage pressure regulator further comprises a cylindrical body enclosing the first valve, the annular wall, the first piston, the second valve, the column, the separating wall, and the second piston.

19. The fuel-cell powered UAV of claim 1, wherein the separating wall is monolithic with the column connected to the separating wall.

* * * * *